Patented Nov. 10, 1942

2,301,854

UNITED STATES PATENT OFFICE 2,301,854

PRINTING INK

Everett F. Carman, Rutherford, N. J., assignor to Interchemical Corporation, New York, N. Y., a corporation of Ohio No Drawing. Application February 8, 1940, Serial No. 317,829

6 Claims. (Cl. 106—30)

This invention relates to printing inks, and has special reference to typographic and the like printing inks adapted to be dried rapidly by the application of heat thereto, and stabilized against evaporation at ordinary temperatures by the inclusion therein of certain macro-crystalline waxes.

Printing inks have recently been introduced, the vehicles of which comprise binders dissolved in organic solvents non-volatile at ordinary room temperatures, but which evaporate rapidly at elevated temperatures; such inks are described and claimed in the Gessler United States Patent No. 2,087,190, issued July 13, 1937. These inks are printed in conventional fashion on typographic presses, and the prints are then passed through ovens in which the temperature is sufficiently high to cause evaporation of the solvent of the ink, often with flashing of the solvent vapor, as described in the Helmer United States Patent No. 2,127,956, issued August 23, 1938.

Cheaper inks of this type have been made with oleoresinous and resinous binders dissolved in hydrocarbon solvents of appropriate evaporation characteristics; and it has been proposed, in inks of this type, to retard evaporation on the press, while permitting evaporation in the heater, by incorporating into the ink various waxes, which are solid during the printing operation, but which melt in the heater. Such additions have been of only minor assistance, however, due to the fact that insufficient wax can be introduced into the ink to be effective if an undesirable graininess in appearance is to be avoided. Not only is this graininess unsightly, but grainy inks do not print as sharply as smooth inks.

I have discovered that if macro-crystalline paraffine waxes having a melting point of 54° C. or higher are incorporated into inks containing hydrocarbon solvents, together with a fatty bitumen such as stearine pitch, the resultant inks have much improved press stability without graininess. The press stability is much superior to similar inks without wax, or to similar inks containing either ordinary micro-crystalline paraffine waxes, or low melting macro-crystalline paraffine waxes.

Even small quantities of the wax help in preventing evaporation at ordinary room temperatures as on the press during printing. Apparently, the wax crystallizes in plates on the surface of the ink, and forms an evaporation retardant film. The effect improves with increase in wax content up to about 5%, when further additions, although not harmful, add nothing to the effect. Additions of very large amounts yield very short buttery inks with an undersirable waxy feel when printed; for this reason, I prefer not to use above about 10% of wax. In the drying operation, the wax film melts under the heater to become part of the liquid phase, and thus fails to retard evaporation of the ink in the drying step.

The base ink may be any ink containing as vehicle a resinous or oleoresinous binder, dissolved in a hydrocarbon solvent; the essential characteristic necessary for effective action of the wax appears to be a slight solubility of the wax in the vehicle, so that the film formation occurs. Since all macro-crystalline paraffin waxes possess this order of solubility in hydrocarbon solvents, the solvent need be selected only with respect to its volatility and solvent action on the binder.

The waxes should have a melting point of at least 54° C., and should melt below the temperatures attained on the printed sheet (80 to 160° C.); no macro-crystalline paraffine wax having a melting point approaching this range is available. I find macro crystalline waxes having a melting point of 64° C. or higher to be particularly desirable.

The melting points herein set forth are obtained by the method of the American Society for Testing Materials, D127–30, described in the 1936 A. S. T. M. standard methods in part 2, page 942.

The fatty bitumen (generally stearine pitch or any other pitch obtained by the distillation of fatty matter) need not be present in substantial quantities to prevent graininess. It should constitute at least 15% of the wax to be effective in preventing graininess, but it may be present in much greater quantities. In black inks, I may use substantial quantities; in other colors, I prefer to use only a small percentage, in order to avoid introduction of the dark color effect given by the bitumen, or to use decolorized stearin pitch.

The use of my compositions permits obtaining of press stability with slightly lower solvent mixtures than those hitherto useful. Good press stability can be obtained with inks containing wax and petroleum hydrocarbon mixture with a 5–95% boiling range of 180–220° C.; and adequate drying can be obtained even with solvents of substantially higher ranges, up to the neighborhood of 270–320° C. boiling ranges. However, since inks with the higher boiling solvents are sufficiently press stable without the wax, there is no particular advantage gained by using the wax in them.

Typical examples of my invention are the following:

Example 1

| | Parts |
|---|---|
| Carbon black | 15.0 |
| Alkali blue | 5.0 |
| Iron blue | 3.0 |
| Limed rosin | 37.7 |
| High solvency Petroleum distillate (distillation range 5% at 216° C., 95% at 251° C.) | 36.0 |
| Stearine pitch | 3.3 |
| Macro-crystalline paraffin wax (M. B. 64.5–65.5° C.) | 5.0 |
| | 105.0 |

In this example, 5% of wax is added to an ink. This quantity was very effective. Above this quantity no particular advantage will be gained.

Example 2

| | Parts |
|---|---|
| Carbon black | 15.00 |
| Alakali blue | 5.00 |
| Iron blue | 3.00 |
| Limed rosin | 36.20 |
| Gilsonite | 1.45 |
| Stearine pitch | 2.17 |
| Petroleum distillate (distillation range 190–230° C.) | 36.20 |
| Macro-crystalline paraffin wax (M. P. 64.5–65.5° C.) | .98 |
| | 100.00 |

Example 3

| | Parts |
|---|---|
| Carbon black | 15.00 |
| Alkali blue | 5.00 |
| Iron blue | 3.00 |
| Limed rosin | 34.00 |
| Stearine pitch | 3.40 |
| Petroleum distillate (distillation range 190–230° C.) | 37.40 |
| Macro-crystalline paraffin wax (M. P. 64.5–65.5° C.) | 2.20 |
| | 100.00 |

In Examples 2 and 3, smaller amounts of wax were used than in Example 1, with excellent results. Amounts as low as 0.1% result in a reduction of evaporation on the rolls.

While I have shown the use of varying quantities of wax with a black ink made with a limed rosin vehicle, the wax will yield similar results with other inks containing other vehicles and other pigments. Substantially all hydrocarbon soluble resinous binders may be used in hydrocarbons solvents. I have used rosin, rosin glycerol ester, and other natural resins, synthetic resins including those of the alkyd, phenolic, and other types, both alone and in combination with oils or other plasticizers. Petroleum distillates are the preferred hydrocarbon solvents; but other hydrocarbons may be used. The pigments used generally in inks of this type may be used in inks made according to my invention; the principal criterion is ability to withstand the heat of the drying oven.

Other changes may be made without departing from the scope of my invention, which is defined in the claims.

I claim:

1. A vehicle for a printing ink characterized by its stability on a typographic press and its rapid drying when exposed in a thin film to intense heat for a short period of time, comprising a resinous binder, a solvent therefor consisting predominantly of petroleum hydrocarbons, a small percentage of a macro-crystalline paraffin wax slightly soluble in the ink solvent, having a melting point of 54° C. or higher and adapted to retard the drying of the ink at temperatures below the melting point of the wax by the formation of a wax film over the ink surface composed of macro-crystals, and a fatty pitch equal to 15% or more of the weight of the wax, whereby graininess of the ink is retarded.

2. The vehicle of claim 1, in which the hydrocarbon solvent has a 5–95% boiling range of at least 180–220° C.

3. The vehicle of claim 1, in which the fatty pitch is stearin pitch.

4. The vehicle of claim 1, in which the fatty pitch is stearin pitch, and the wax has a melting point of 64–67° C.

5. A printing ink comprising pigment dispersed in a vehicle for a printing ink characterized by its stability on a typographic press and its rapid drying when exposed in a thin film to intense heat for a short period of time, comprising a resinous binder, a solvent therefor consisting predominantly of petroleum hydrocarbons, a small percentage of a macro-crystalline paraffin wax slightly soluble in the ink solvent, having a melting point of 54° C. or higher and adapted to retard the drying of the ink at temperatures below the melting point of the wax by the formation of a wax film over the ink surface composed of macro-crystals, and a fatty pitch equal to 15% or more of the weight of the wax, whereby graininess of the ink is retarded.

6. A printing ink comprising pigment dispersed in a vehicle for a printing ink characterized by its stability on a typographic press and its rapid drying when exposed in a thin film to intense heat for a short period of time, comprising a resinous binder, a solvent therefor consisting predominantly of petroleum hydrocarbons, a small percentage of macro-crystalline paraffin wax slightly soluble in the ink solvent, having a melting point of 64° C. or higher and adapted to retard the drying of the ink at temperatures below the melting point of the wax by the formation of a wax film over the ink surface composed of macro-crystals, and a fatty pitch equal to 15% or more of the weight of the wax, whereby graininess of the ink is retarded.

EVERETT F. CARMAN.